US008768686B2

(12) United States Patent
Sarikaya et al.

(10) Patent No.: US 8,768,686 B2
(45) Date of Patent: Jul. 1, 2014

(54) MACHINE TRANSLATION WITH SIDE INFORMATION

(75) Inventors: Ruhi Sarikaya, Shrub Oak, NY (US);
Jiri Navratil, Cortlandt Manor, NY (US); Bhuvana Ramabhadran, Mount Kisco, NY (US); David Eubensky, Brookfield, CT (US); Salim Estephan Roukos, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 12/779,751

(22) Filed: May 13, 2010

(65) Prior Publication Data

US 2011/0282648 A1 Nov. 17, 2011

(51) Int. Cl.
*G06F 17/28* (2006.01)
(52) U.S. Cl.
USPC ........................................ 704/2; 704/3; 704/4
(58) Field of Classification Search
USPC ........................................................ 704/2–8
See application file for complete search history.

(56) References Cited

U.S. PATENT DOCUMENTS

| 6,484,136 | B1 | 11/2002 | Kanevsky et al. |
| 7,587,307 | B2 | 9/2009 | Cancedda et al. |
| 8,027,438 | B2 * | 9/2011 | Daigle et al. ............... 379/88.06 |
| 2004/0102956 | A1 * | 5/2004 | Levin ................................ 704/2 |
| 2004/0153305 | A1 * | 8/2004 | Enescu et al. ..................... 704/2 |
| 2004/0260532 | A1 | 12/2004 | Richardson et al. |
| 2005/0005240 | A1 | 1/2005 | Reynar et al. |
| 2005/0021322 | A1 | 1/2005 | Richardson et al. |
| 2007/0094169 | A1 | 4/2007 | Yamada et al. |
| 2008/0215309 | A1 | 9/2008 | Weischedel et al. |
| 2008/0243472 | A1 * | 10/2008 | DeGroot et al. ................. 704/2 |
| 2008/0249760 | A1 | 10/2008 | Marcu et al. |
| 2009/0055164 | A1 | 2/2009 | Hu et al. |
| 2009/0192781 | A1 | 7/2009 | Bangalore et al. |
| 2009/0234633 | A1 * | 9/2009 | Chao-Suren et al. ............. 704/2 |
| 2010/0030551 | A1 * | 2/2010 | Ark et al. ......................... 704/8 |

FOREIGN PATENT DOCUMENTS

| WO | WO 2006/099621 | 9/2006 |
| WO | WO 2006/133571 | 12/2006 |

* cited by examiner

*Primary Examiner* — Jesse Pullias
(74) *Attorney, Agent, or Firm* — Anne V. Dougherty, Esq.; McGinn IP Law Group, PLLC

(57) ABSTRACT

A method of identifying and using side information available to statistical machine translation systems within an enterprise setting, the method including extracting user-specific interaction and non-interaction-based information from at least one corresponding database within the enterprise for each of a plurality of users, aggregating the user-specific interaction and non-interaction based information from a plurality of users, by using a processor on a computer, to tune and adapt background translation and language models, and updating all relevant models within the enterprise after user activity based on the tuned and adapted translation and language models.

23 Claims, 6 Drawing Sheets

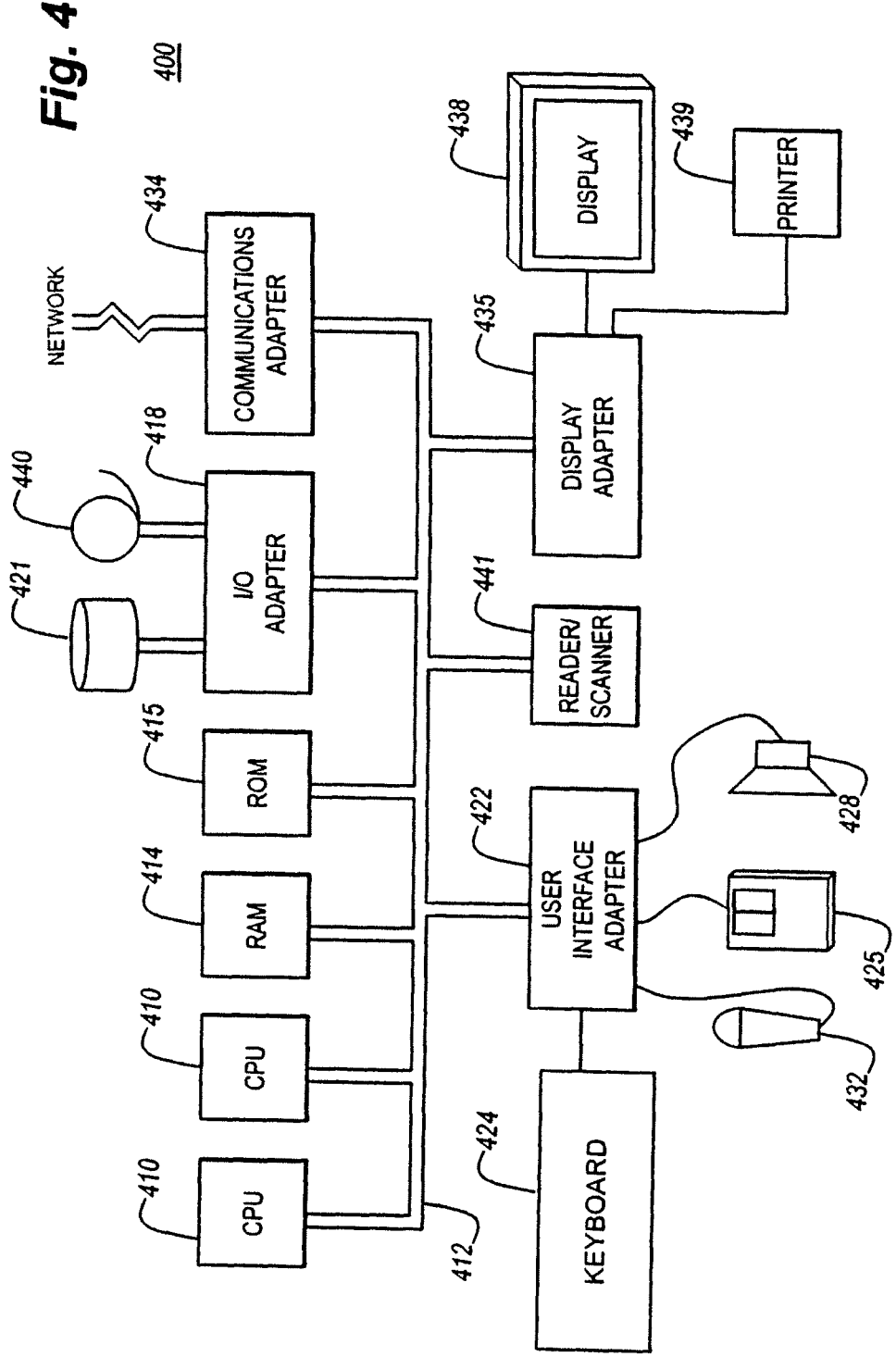

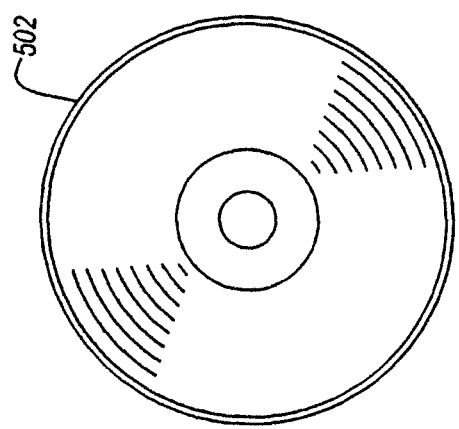
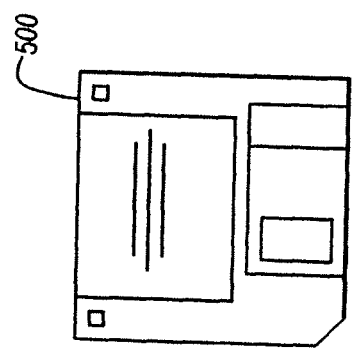
Fig. 5

MACHINE TRANSLATION WITH SIDE INFORMATION

BACKGROUND OF THE INVENTION

1. Field of the Invention

The present invention generally relates to a method and apparatus for identifying side information available to statistical machine translation (SMT) systems and, more particularly, identifying side information available to SMT systems within an enterprise setting (or in a social networking site like Facebook®), and using this information to improve SMT systems.

2. Description of the Related Art with Regards to Current Invention

Individual level side information sources are largely based on each user's social/professional network within an enterprise) and personal level information such as age, language skills, etc. Enterprises can consist of traditional companies. In addition, social/professional networking sites (e.g., Facebook, or E-harmony®) can be considered as an enterprise where the users communicate (in a multimodal fashion) within an umbrella of these sites and provide personal information to the sites and all the activities of a user or user-pair are stored in the databases.

Side information includes all the multi-media forms of activity and communication used. For example, a first type of side information may be instant messaging chat history with each individual in a contact list for an activity as well as the people on the contact list. Another example of side information can include e-mail history (exchanged by two or more users) and topic history (between two or more people) relating to the topic between two or more users. Furthermore, side information can include voice-mail (e.g., messages between the two users, messages between multiple users relating to the same topic, meeting transcription/seminars attended by the two users, and shared interest membership to a particular activity between the two users).

Next, group level side information can include groups of users belonging to the same organization/department/interest (e.g., soccer).

There are fundamental differences between Machine Translation (MT) and speech recognition. For example, conventionally, machine translation (MT) has alignments between a source language and a target language. With side information, the alignments can be improved. There is no such thing as source/target language alignment in speech and other natural language processing (NLP) fields.

Translation by its nature is used between two or more people or parties as well as in a one-way scenario. As such, there is parallel or quasi parallel data as side information. At any given time, there are two streams of data on each user side: what the user is typing and what is being translated from the other user.

Conventionally, dialog histories in speech applications are limited to the specific sessions that a user is interacting with the system (e.g., booking a flight). Conventional speech/NLP system would not remember what the user has done a month/year ago. In a chat between two users in an enterprise setting, the dependency (on history information) can easily go beyond days and weeks. The context can still be helpful to translation. Thus, the differences between machine translation and speech recognition are highlighted because the side information for speech recognition are different from side information for machine translation as they solve two different problems.

Conventional MT combines roughly 10+ features to obtain a combined total score at any point in the search (speech has typically fixed weights, LM and AM). Tuning the feature weights for user-pair/topic in translation has a significant impact as compared to tuning language model (LM) weights and acoustic model (AM) weights (they are largely fixed) in speech recognition. Text resources such as instant messaging, e-mails, etc. can only be used to adapt LM in speech recognition and not the AM, whereas these text resources can be used to adapt and/or update both AM LM models as well as other models used in conventional translating.

BRIEF SUMMARY

In view of the foregoing, and other, exemplary problems, drawbacks, and disadvantages of the conventional systems, it is an exemplary feature of the present invention to provide a method of identifying and using side information available to statistical machine translation systems within an enterprise setting, the method including extracting user-specific interaction and non-interaction based information from at least one corresponding database within the enterprise for each of a plurality of users, aggregating the user-specific interaction and non-interaction based information from a plurality of users, using a processor on a computer, to tune and adapt background translation and language models, and updating all relevant models within the enterprise after user activity based on the tuned and adapted translation and language models.

In view of the foregoing, and other, exemplary problems, drawbacks, and disadvantages of the conventional systems, it is an exemplary feature of the present invention to provide an user-activity monitoring system including a plurality of side information databases comprising user interaction based and non-interaction based activity data for a plurality of users across an enterprise and a user-activity aggregation unit, as executed by a processor on a computer, configured to aggregate user-specific activity from the side information databases.

The present invention exemplarily aggregates information from these various users to tune/adapt background translation and language models and create user-pair profiles/signatures by using the side information.

In addition, in the present invention, the users would exemplarily not enroll or submit their data to a server for the sake of machine translation; it is preferable that the side information is acquired seamlessly from respective databases without the users knowing about it. Therefore, model adaptation/tuning/retraining should not require anything from the users. The present invention can exemplarily create user-pair models by aggregating all the communication/interaction history from the point the users start to communicate. In the current invention, the users exemplarily do not have to enroll.

BRIEF DESCRIPTION OF THE SEVERAL VIEWS OF THE DRAWINGS

The foregoing and other purposes, aspects and advantages will be better understood from the following detailed description of an exemplary embodiment of the invention with reference to the drawings, in which:

FIG. 4 illustrates a typical hardware configuration which may be used for implementing the computer system and method according to the exemplary aspects of the present invention; and FIG. 5 illustrates a data storage medium 500 (e.g., a magnetic diskette, optical disc, etc.) to store the method 300.

DETAILED DESCRIPTION OF EXEMPLARY EMBODIMENT OF THE INVENTION

Figure 1:
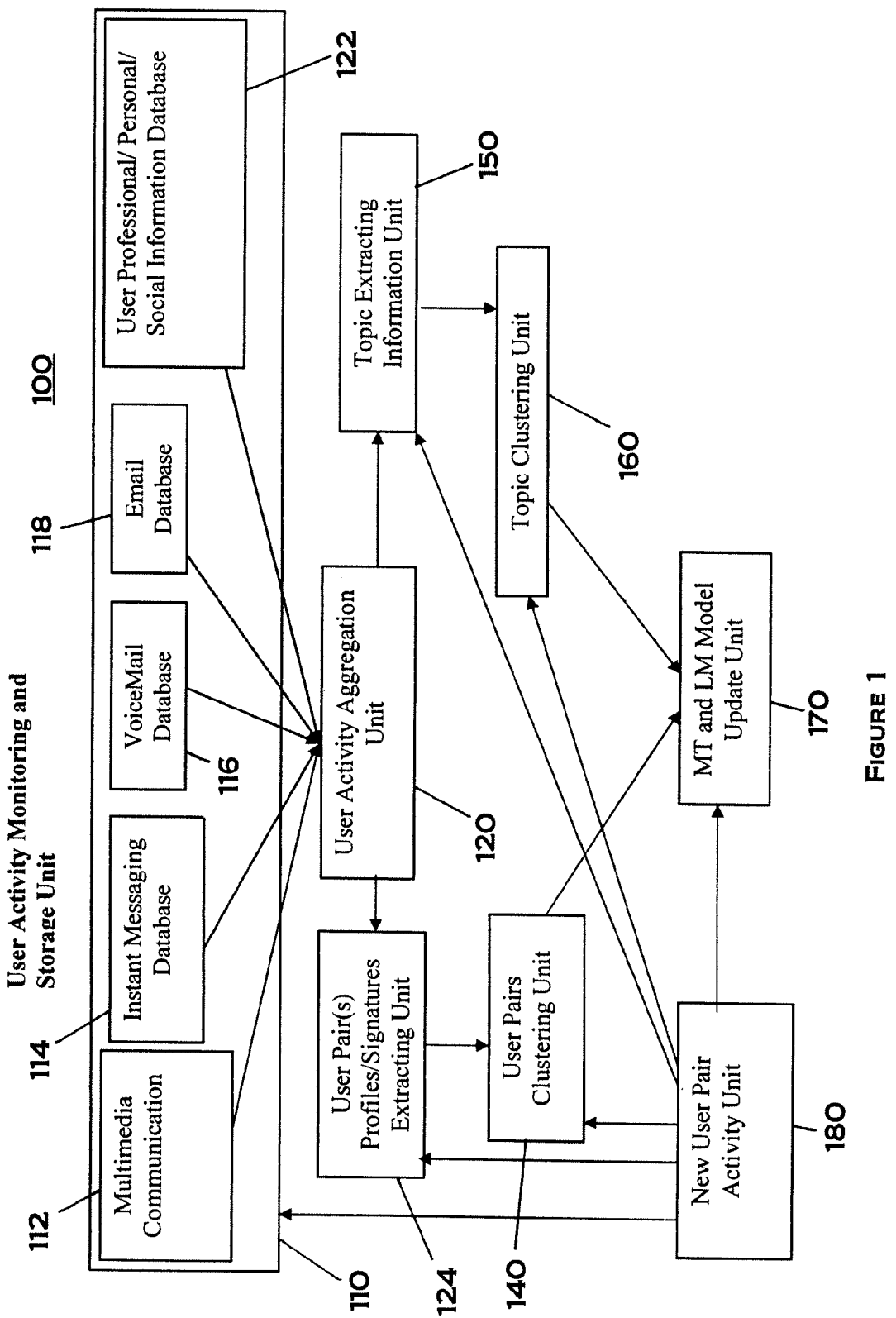
FIG. 1 illustrates an exemplary system 100 at a high level for user activity monitoring and storage, user activity tracking/logging, activity aggregation, user pair and topic clustering, and MT and LM build/update/train/tune.

Referring now to the drawings, and more particularly to FIGS. 1-5, there are shown exemplary embodiments of the method and structures according to the present invention.

Exemplarily, the present invention provides a system to monitor and store all forms of individual user activity in respective databases. Activity (i.e., side information) exemplarily refers to all forms of multimedia communications and interaction between user pairs, including but not limited to, instant messaging, e-mails, voice-mails, etc.

FIG. 1 illustrates an exemplary embodiment of a user activity monitoring and storage system 100 according to the present invention. Referring to FIG. 1, user activity monitoring and storage system 100 can include side information 110. Side information 110 can exemplary include, among other things, multimedia communication records stored in multimedia communication records database 112, Instant Messaging as stored in Instant Messaging Database 114, Voice-mail Database 116, E-mail Database 118, and User Professional Information Database 122. Of course, the invention is not limited to these forms of side data and may include any side data known in the art.

Exemplarily, user activity monitoring and storage system 100 may include user activity aggregation unit 120 being configured to extract user-specific non-interaction based information, such as profession/job-title/age/nationality, etc. In the present embodiment, user activity aggregation unit 120 would search User Professional Information Database 122 for user-specific non-interaction based information. Then, after extracting the information, the present invention would aggregate all forms of user-specific activity and information, arising in the past and present, from other side data, such as from multimedia communication records 112, Instant Messaging Database 114, Voice-mail Database 116, and E-mail Database 118, as well as all other potential forms of side data. Exemplarily, the present invention can aggregate all forms of user-specific activity and information in the past and present. The present invention exemplary discovers/extracts common user activities and establishes relationships between users and determines the nature of the relationship.

User activity monitoring and storage system 100 can also include user pair signature unit 124 being configured to create user-pair profiles/signatures by using the side information from side information data 110.

Exemplarily, the present invention includes clustering unit 130 configured to pair-up user(s) according to their coinciding aggregate activity. For example, users may be paired-up based on their previous communications in instant messaging, or users who had e-mail exchanges, or users from within a same department or origination.

Exemplarily, the present invention can also include a user pair clustering unit 140 to cluster the user pairs to create mini user-pair networks or social/professional interest groups.

Exemplarily, the present invention can include topic extraction unit 150 to extract different topics based on an analysis of aggregate user activity across all users. Exemplarily, topic clusterer 160 would then cluster different detailed topics into a set of more coherent and relevant larger topics.

Exemplarily, all of the above units would be configured to take place offline or online. Next, when a new user activity has taken place, the present invention would include New User Pair Activity Unit 180 that would determine, from the database, any users involved or affected by a user's activity.

Exemplarily, the present invention can also include MT and LM model update unit 170 being configured to bring out their multimedia history and built/adapt/tune the generic MT models (and also the decoder) to create a user-pair specific set of MT models (and decoder). That is, the present invention can also create also user-pair specific LMs, by adapting/tuning the existing model or creating a target LM using the user-pair multimedia interaction history. In addition, MT and LM model update unit 170 would also perform tuning/adaptation/building for the topic clusters.

Exemplarily, updated/adapted models from New User Pair Activity Unit 170 would improve the MT performance and quality of interaction between users.

Exemplarily, the present invention can record all the ongoing user activity in the respective databases to be used for the future interactions/communications.

Exemplarily, the present invention can pair-up user(s) according to their aggregate activity. For example, users previously communicated in instant messaging, or users who had e-mail exchanges or users from the same department can be paired-up effectively.

Figure 2:
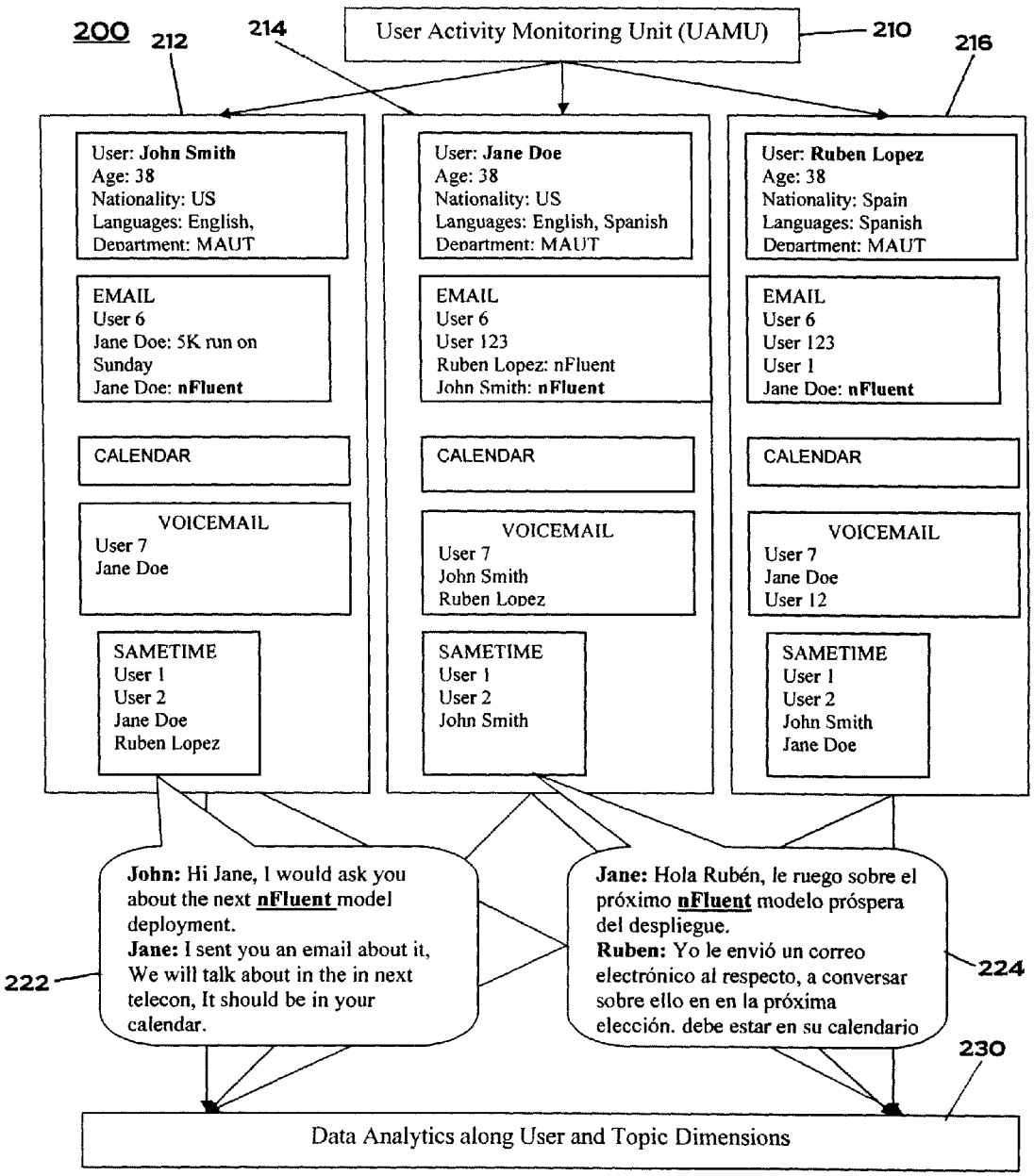
FIG. 2 illustrates an exemplary User Activities and Interactions Monitoring Unit 200.
Figure 3A:
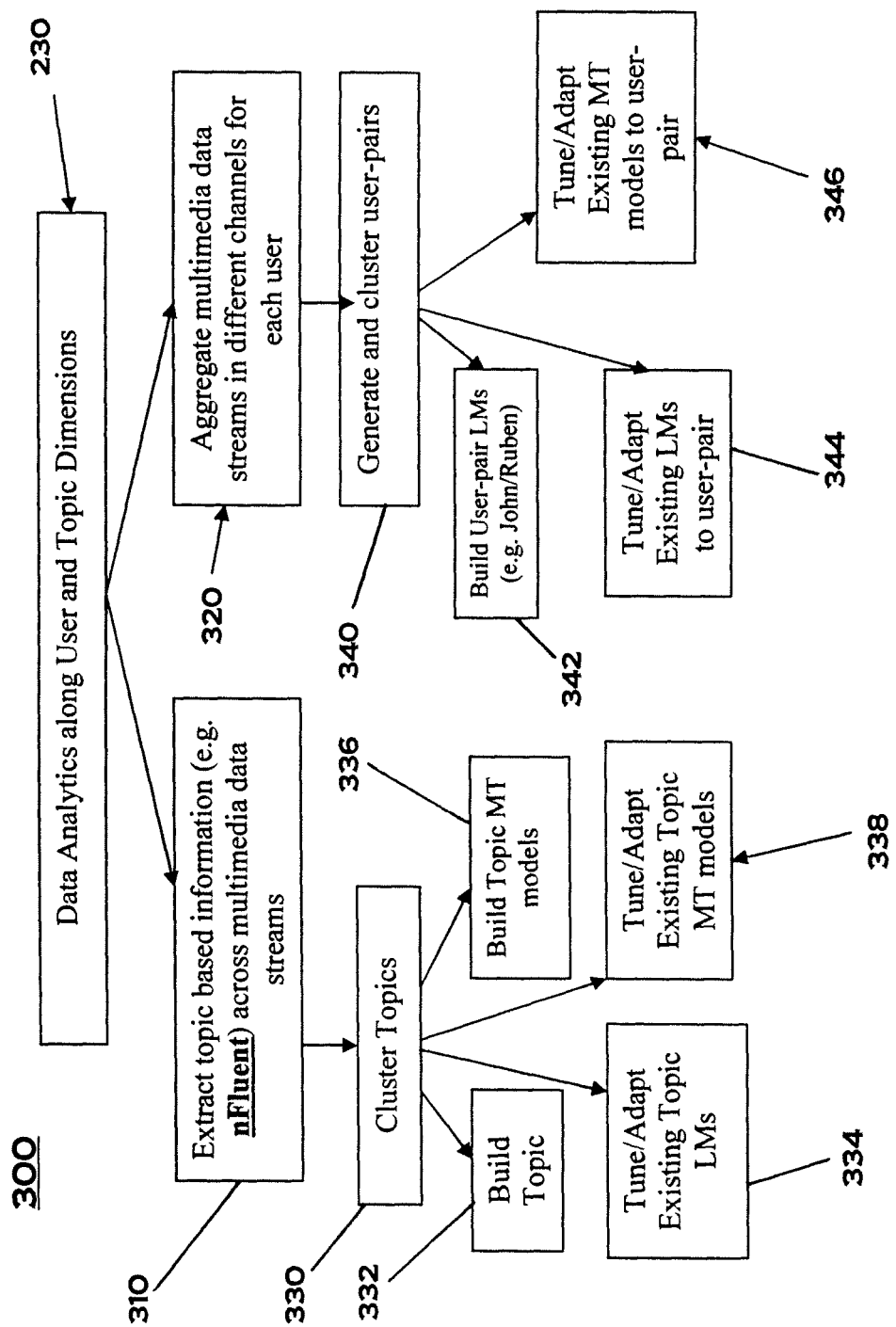
FIG. 3A illustrates an exemplary method for data Analysis along user and topic dimensions 300 to be use for MT and LM.

Next, a detailed embodiment of the invention is illustrated in FIGS. 2 and 3A. Referring to FIGS. 2 and 3A, three users engaged in Instant Messaging (e.g., Sametime), E-mail, Calendar, and Voice-mail communications are provided. That is, users John Smith 212, Jane Doe 214, and Ruben Lopez 216 are clustered because of their work on a hypothetical nFluent project. Each of John Smith 212, Jane Doe 214, and Ruben Lopez 216 has various communication data within their respective side database, including e-mail and voice-mail. John speaks only English, Jane speaks both English and Spanish and Ruben speaks only Spanish.

Referring to FIGS. 2 and 3A, Data Analytics Along User and Topic Dimension (DAUTD) 230 would be performed to determine that all three are interconnected (via Sametime, voice-mail, and e-mail activity). Next, DAUTD 230 determines that John/Jane communicates in English (via language ID on the e-mails/chat dialogs and user profile). Exemplarily, DAUTD 230 would determine that Jane/Ruben communicates in Spanish (via language ID on the e-mails/chat dialogs and user profile).

Next, UAMU 210 would exemplarily determine that John/Ruben communicates through MT (MT translates between En/Es) (via language ID on the e-mails/chat dialogs and user profile telling that they do not speak any common languages). Next, UAMU 210 would exemplarily retrieve the entire instant messaging (e.g., Sametime) dialog logs between John/Jane, Jane/Ruben and John/Ruben (note that the dialogs between John and Ruben are MT mediated; John types in English and Ruben types in Spanish).

Next, UAMU 210 would exemplarily retrieve all the e-mail exchanges between these user pairs. After that, UAMU 210 would also exemplarily retrieve voice-mail transcriptions between these user pairs. In addition, UAMU 210 would also scan the calendars of these users and may, for example, discover that there is a seminar (i.e. nFluent deployment) that both John and Jane attended. UAMU 210 could then retrieve the abstract and the content text from the corresponding databases.

Next, UAMU 210 would exemplarily aggregate the information history in different multimedia channels as illustrated in Step 320 where data analytics is performed along user and topic dimensions. Referring to FIG. 3A, after that, Step 230 could exemplarily also build a new English LM for John-Ruben MT using all the aggregated Sametime (and Voice-mail, E-mail, Calendar, etc.) data of John/Jane, as performed in Step 342. Exemplarily, this would be done using existing LMs (via interpolation).

Next, UAMU 210 could exemplarily also build a new Spanish LM for John/Ruben MT using aggregated Sametime (and Voice-mail, E-mail, Calendar, etc.) data of Ruben/Jane. In some embodiments, this Spanish LM may be used in combination with existing LMs (via interpolation).

Next UAMU 210 could exemplarily also build a new user-pair MT Model for John/Ruben using all the aggregated bilingual Sametime data from previous John/Ruben chats and also chats between other user pairs related to project nFluent.

In another embodiment, in the process of building new LM and MT models, aggregated data could be used to tune/adapt existing LM and MT models to the specific user-pairs in Step 344. The exemplarily tuning and adapting could include an step in which tuning the LM can be either building a new LM for the user-pair data and interpolating it with the existing LMs, or it can be used to adjust parameters of the existing model. Likewise, tuning MT models in Step 346 can be done in the form of using newly created bilingual data to extract phrase pairs and combining these phrase-pairs with the phrase pairs obtained from the existing bilingual data. It can also be used as development data to adjust the weights of MT along with LM.

Exemplarily, the present invention would include topic clustering unit 330 that scans all the information channels for all the users and retrieves all the relevant data to generate topic specific data in different channels. For example in the figure below, all the multimedia forms of data containing the word "nFluent" would be retrieved and clustered to build topic specific language and MT models in Step 336.

Exemplarily, the present invention would include all of the above steps using these "side information" to build a topic LM in Step 332 and to also tune or adapt existing topic LM and MT models to specific user-pair or topic in Step 334 and 338, respectively, before actually using the newly tuned/built LM and MT models for new bilingual chat between John and Ruben. This (prior) side information contains the fact that John/Ruben is related through a project called nFluent and their next bilingual chat is likely to be about nFluent. As such, integrating the prior side information to the LM and MT models to do the English/Spanish translation between them would certainly improve the translation accuracy.

Therefore, in the operation of the exemplarily system, since the relationship between John/Ruben is about nFluent, the system would exemplarily pull in all the multimedia information streams containing nFluent (this could be easily be determined using an information retrieval unit) for all the users to build the English and Spanish LM and MT. For example, Jack and Oscar could be related via nFluent they may or may not be connected with John and Ruben. Therefore, using their data in building/tuning models for John/Ruben should improve translation performance.

Figure 3B:
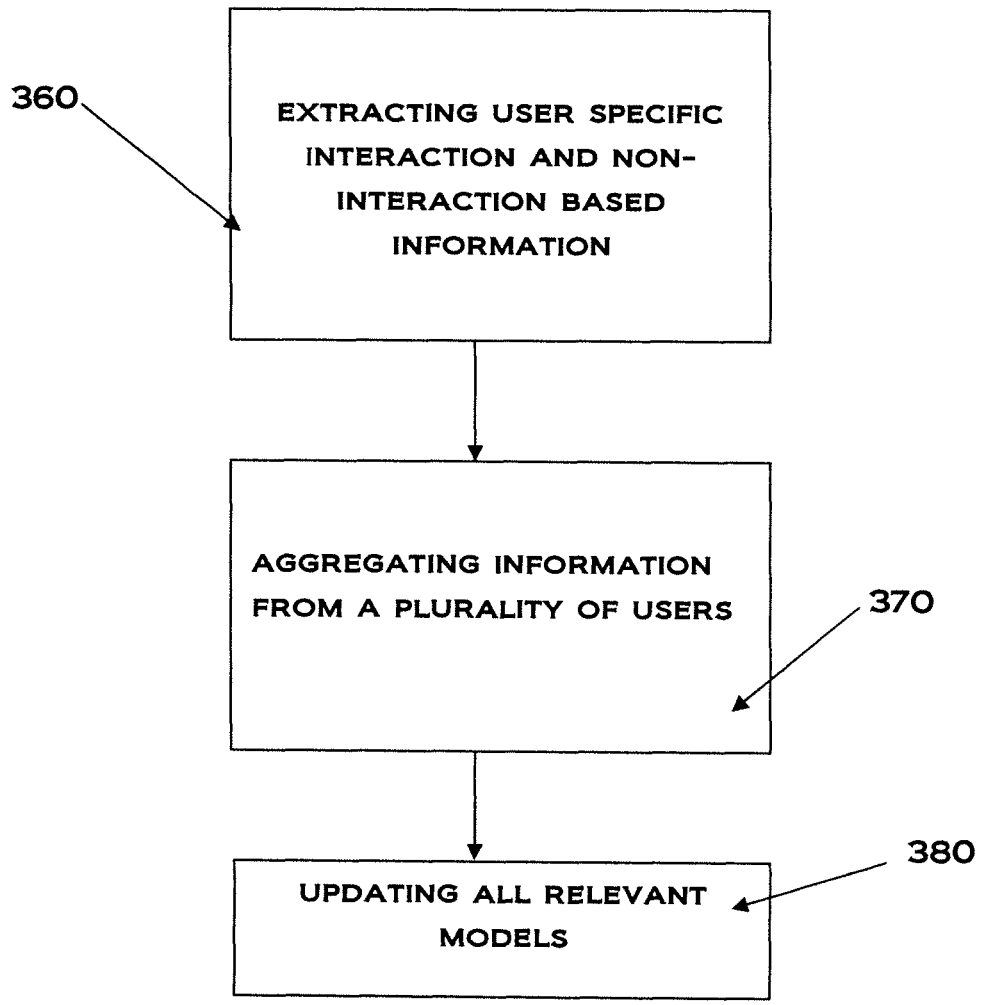
FIG. 3B illustrates an exemplary method 350 of identifying and using side information.

FIG. 3B illustrates an exemplary method 350 of an embodiment of identifying and using side information. Referring to FIG. 3B, method 350 exemplarily begins at Step 360 in which user-specific interaction and non-interaction based information is extracted from a corresponding databases within the enterprise for each of a plurality of users. Then, in Step 370, information from a plurality of users is aggregated, using a processor on a computer, to tune and adapt background translation and language models. Step 380 illustrates a step in which all relevant models are updated after each user activity within the enterprise.

Referring now to FIG. 4, system 400 illustrates a typical hardware configuration which may be used for implementing the inventive system and method for buying and selling merchandise. The configuration has preferably at least one processor or central processing unit (CPU) 410. The CPUs 410 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting an information handling system to a data processing network, the Internet, and Intranet, a personal area network (PAN), etc. and a display adapter 436 for connecting the bus 412 to a display device 438 and/or printer 439. Further, an automated reader/scanner 441 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 410 to execute a sequence of machine-readable instructions. These instructions may reside in various types of tangible signal bearing media.

Thus, this aspect of the present invention is directed to a programmed product, comprising tangible signal-bearing storage media tangibly embodying a program of machine-readable instructions executable by a digital data processor incorporating the CPU 410 and hardware above, to perform the method of the invention.

This signal-bearing media may include, for example, a RAM contained within the CPU 410, as represented by the fast-access storage for example. Alternatively, the instructions may be contained in another tangible signal-bearing storage media, such as a magnetic data storage diskette 500 or CD-ROM 502, (FIG. 5), directly or indirectly accessible by the CPU 410.

Whether contained in the computer server/CPU 510, or elsewhere, the instructions may be stored on a variety of tangible machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing storage media, including storage devices in transmission media storing instructions in formats such as digital and analog and memory devices in communication links communication links and wireless. In an illustrative embodiment of the invention, the machine-readable instructions may comprise software object code, complied from a language such as "C++," etc.

While the invention has been described in terms of exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A method of identifying and using side information available to statistical machine translation systems within an enterprise setting, the method comprising:
    extracting user specific interaction and non-interaction based information from at least one corresponding database within the enterprise for each of a plurality of users;
    aggregating said user specific interaction and non-interaction based information from a plurality of users, using a processor on a computer, to tune and adapt background translation and language models;
    updating all relevant models within the enterprise after user activity based on the tuned and adapted translation and language models; and
    using generic machine translation (MT) models to create a user-pair specific set of MT models.

2. The method according to claim 1, further comprising performing data analytics along each of the plurality of users and each of a plurality of topic dimensions.

3. The method of claim 2, wherein said performing said data analytics comprises at least one of:
    analyzing individual user data;
    extracting relationships between different users; and
    determining a nature of a relationship between different users-pairs.

4. The method of claim 2, wherein said performing said data analytics comprises at least one of:
    mining topics; and
    extracting topics.

5. The method of claim 2, wherein said performing said data analytics comprises tagging user activity into a list of categories to define a type of a relationship between user pairs.

6. The method according to claim 1, further comprising creating interest groups using user-pairs.

7. The method according to claim 1, further comprising creating user-pair profiles via said side information.

8. The method according to claim 1, further comprising creating user signatures via said side information.

9. The method according to claim 1, further comprising aggregating topic based information across the plurality of users in parallel.

10. The method according to claim 1, further comprising clustering topic based info illation across the plurality of users in parallel, wherein said clustering is conducted according to the plurality of users coinciding aggregate activity.

11. The method according to claim 1, further comprising creating user-pair specific language models (LMs), by adapting/tuning the existing model or creating a target LM using a user-pair multimedia interaction history.

12. The method of claim 1, wherein said side information comprises at least one of an instant messaging, a chat history, an email, a history, a topic history, a voice mail, messages, a meeting transcription, user blogs, and calendars.

13. The method of claim 1, wherein specific non-interaction based information comprises at least one of a profession, a job-title, an age, languages spoken, a nationality of a user, and a group that the user belongs to.

14. The method of claim 1, wherein said creating the user-specific set of MT models comprises tuning the MT models using bilingual data aggregated from a said user specific interactions to extract phrase pairs and combining said phrase-pairs with phrase pairs obtained from existing bilingual data.

15. A user-activity monitoring system, comprising:
    a plurality of side information databases comprising user interaction based and non-interaction based activity data for a plurality of users across an enterprise;
    a user-activity aggregation unit, as executed by a processor on a computer, configured to aggregate user specific activity from the side information databases; and
    a machine translation (MT) model update unit to adapt generic MT models and to create a user-pair specific set of MT models.

16. The user-activity monitoring system according to claim 15, further comprising a user pair profile extracting unit, as executed by said processor, configured to create user-pair profiles/signatures based on the side information.

17. The user-activity monitoring and storage unit according to claim 15, further comprising a topic extracting unit configured to extract topics common to a user pair among the plurality of users.

18. The user-activity monitoring and storage unit according to claim 15, further comprising a user pair clustering unit configured to pair-up users according to an aggregate activity of the users.

19. The user-activity monitoring and storage unit according to claim 15, further comprising a topic clustering unit to extract different topics based on an analysis of an aggregate user activity across all users in the enterprise.

20. The user-activity monitoring and storage unit according to claim 15, further comprising a new user pair activity unit configured to determine when a new user activity has taken place and to look up from the database any of the plurality of users involved or affected by the new user activity.

21. The user-activity monitoring and storage unit according to claim 15, further comprising a language model (LM) update unit to create a user-pair specific LM by adapting an existing LM model or creating a target LM using a user-pair multimedia interaction history.

22. The user-activity monitoring and storage unit according to claim 15, wherein said user pair clustering unit clusters the user pairs to create sub user-pair networks.

23. The user-activity monitoring and storage unit according to claim 15, wherein said topic clustering unit clusters different detailed topics into a set of more coherent and relevant larger topics.

* * * * *